United States Patent
Levy et al.

(10) Patent No.: US 10,939,049 B2
(45) Date of Patent: *Mar. 2, 2021

(54) SENSOR AUTO-CONFIGURATION

(71) Applicant: SAMSUNG ELECTRONICS CO., LTD., Suwon-si (KR)

(72) Inventors: Nathan Henri Levy, Givatayim (IL); Ariel Orfaig, Kfar Bin-Nunn (IL); Sebastien Derhy, Tel Aviv (IL); Shachaf Amir, Herzeliya (IL); Yoel Yaffe, Modiin (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,742

(22) Filed: Aug. 17, 2020

(65) Prior Publication Data

US 2020/0389583 A1 Dec. 10, 2020

Related U.S. Application Data

(63) Continuation of application No. 16/042,479, filed on Jul. 23, 2018, now Pat. No. 10,812,730.

(51) Int. Cl.
*H04N 5/235* (2006.01)
*H04N 5/232* (2006.01)
*G06T 7/70* (2017.01)

(52) U.S. Cl.
CPC ............ *H04N 5/2353* (2013.01); *G06T 7/70* (2017.01); *H04N 5/2351* (2013.01); *H04N 5/23258* (2013.01); *H04N 5/23267* (2013.01); *H04N 5/2355* (2013.01)

(58) Field of Classification Search
USPC ....................................................... 348/169
See application file for complete search history.

(56) References Cited

U.S. PATENT DOCUMENTS

| | | | |
|---|---|---|---|
| 2017/0150076 A1* | 5/2017 | Hizi | H04N 5/35563 |
| 2018/0376090 A1 | 12/2018 | Liu | |
| 2019/0052788 A1* | 2/2019 | Liu | H04N 5/23258 |
| 2019/0057046 A1* | 2/2019 | Herrmann | H04N 21/41422 |
| 2019/0098217 A1* | 3/2019 | Zhou | H04N 5/3532 |
| 2020/0029006 A1 | 1/2020 | Levy et al. | |

FOREIGN PATENT DOCUMENTS

| | | |
|---|---|---|
| WO | 2017197651 | 11/2017 |

* cited by examiner

*Primary Examiner* — Patricia I Young
(74) *Attorney, Agent, or Firm* — F. Chau & Associates, LLC

(57) ABSTRACT

Methods, apparatuses, and systems are described for positional tracking (PT) in Augmented Reality (AR) applications. The method may include creating different images for AR preview and PT applications. In some cases, the PT information utilizes key point information. The AR preview and the PT images may be generated simultaneously using time division, space division, split timing, or any combination thereof. This may result in PT with significantly less motion blur. Accordingly, the PT will be more robust, and there will be more good frames available for key components of a PT algorithm (i.e., using visual PT to calibrate the biases of an inertial measurement unit). Thus, the methods and apparatus of the present disclosure may enable more effective management of the trade-off between motion-blur, noise and resolution for PT.

20 Claims, 12 Drawing Sheets

PT Period

AR Preview Period

PT Period

AR Preview Period

PT Period

AR Preview Period

SENSOR AUTO-CONFIGURATION

CROSS-REFERENCE

This application is a continuation of U.S. patent application Ser. No. 16/042,479, titled SENSOR AUTO-CONFIGURATION and filed on Aug. 17, 2018 in the United States Patent and Trademark Office, the disclosure of which is incorporated by reference in its entirety.

BACKGROUND

The following relates generally to computer vision, and more specifically to positional tracking (PT) in Augmented Reality (AR) applications or Virtual Reality (VR) applications.

AR can be defined as a live view of a physical environment that is overlaid with computer-generated information. In some cases, the computer-generated information is perceptual stimulation across multiple sensory modalities such as visual, auditory, haptic, somatosensory, and olfactory. In some cases, the computer generated sensory information can be constructive (i.e. adding to the natural environment). In other cases, the information can be destructive (i.e. masking of the natural environment). AR devices may present the overlaid information such that it is perceived as part of the real world. Thus, AR may present an immersive experience that alters a user's current perception of their environment. AR can be contrasted with virtual reality, which immerses a user in a completely simulated environment. AR may also be known as mixed reality, or computer-mediated reality.

Some cell-phones and AR headsets use the camera to provide an AR experience. An AR camera may be used both for an AR preview and for PT. In some cases, a camera configured in the optimal way for AR preview (i.e., taking into account illumination only), may not be optimized for PT. In particular, the camera may not be configured to account for motion blur and tracking degradation when the camera is moving fast. In case of VR, preview is optional but configuration of the camera for high motion may result in inferior performance of PT in relatively slow camera motion for example in low illumination scenes. The same methods used in AR may be used in VR.

SUMMARY

A method for positional tracking in Augmented Reality (AR) applications is described. The method may include exposing pixels of a first group with a corresponding exposure time period that is determined at least based on information obtained from an inertial measurement unit (IMU), exposing pixels of a second group of pixels with a predetermined exposure time period at least based on information related to illumination condition, determining a position of each of multiple identified points in a first image constructed from the pixels of the first group, and displaying a second image constructed from the pixels of the second group.

An apparatus for positional tracking in AR applications is described. The apparatus may include a processor, memory in electronic communication with the processor, and instructions stored in the memory. The instructions may be operable to cause the processor to expose pixels of a first group with a corresponding exposure time period that is determined at least based on information obtained from an IMU, expose pixels of a second group of pixels with a predetermined exposure time period at least based on information related to illumination condition, determine a position of each of multiple identified points in a first image constructed from the pixels of the first group, and display a second image constructed from the pixels of the second group.

A non-transitory computer readable medium storing code for positional tracking in AR applications is described. In some examples, the code comprises instructions executable by a processor to: expose pixels of a first group with a corresponding exposure time period that is determined at least based on information obtained from an IMU, expose pixels of a second group of pixels with a predetermined exposure time period at least based on information related to illumination condition, determine a position of each of multiple identified points in a first image constructed from the pixels of the first group, and display a second image constructed from the pixels of the second group.

An apparatus for positional tracking in AR applications is described. The apparatus may include means for exposing pixels of a first group with a corresponding exposure time period that is determined at least based on information obtained from an IMU, means for exposing pixels of a second group of pixels with a predetermined exposure time period at least based on information related to illumination condition, means for determining a position of each of multiple identified points in a first image constructed from the pixels of the first group, and means for displaying a second image constructed from the pixels of the second group.

A method for positional tracking in AR applications is described. The method may include exposing pixels of a first group in a row with a first exposure time, wherein the first exposure time period that is determined at least based on information obtained from an IMU, exposing pixels of a second group of pixels in the row with a second exposure time period, determining a position of each of multiple identified points in a first image that includes the pixels of the first group in the row, and displaying a second image that includes the pixels of the second group in the row.

An apparatus for positional tracking in AR applications is described. The apparatus may include a processor, memory in electronic communication with the processor, and instructions stored in the memory. The instructions may be operable to cause the processor to expose pixels of a first group in a row with a first exposure time, wherein the first exposure time period that is determined at least based on information obtained from an IMU, expose pixels of a second group of pixels in the row with a second exposure time period, determine a position of each of multiple identified points in a first image that includes the pixels of the first group in the row, and display a second image that includes the pixels of the second group in the row.

A non-transitory computer readable medium storing code for positional tracking in AR applications is described. In some examples, the code comprises instructions executable by a processor to: expose pixels of a first group in a row with a first exposure time, wherein the first exposure time period that is determined at least based on information obtained from an IMU, expose pixels of a second group of pixels in the row with a second exposure time period, determine a position of each of multiple identified points in a first image that includes the pixels of the first group in the row, and display a second image that includes the pixels of the second group in the row.

An apparatus for positional tracking in AR applications is described. The apparatus may include means for exposing pixels of a first group in a row with a first exposure time, wherein the first exposure time period that is determined at least based on information obtained from an IMU, means for exposing pixels of a second group of pixels in the row with a second exposure time period, means for determining a position of each of multiple identified points in a first image that includes the pixels of the first group in the row, and means for displaying a second image that includes the pixels of the second group in the row.

In some examples of the method, apparatus, and non-transitory computer-readable medium described above, the first image is constructed from the pixels of the first group in each of multiple rows. In some examples of the method, apparatus, and non-transitory computer-readable medium described above, the second image is constructed from the pixels of the second group in each of multiple rows.

In some examples of the method, apparatus, and non-transitory computer-readable medium described above, the first exposure time period that is determined at least based on information related to iIbumination condition and the information obtained from the IMU. In some examples of the method, apparatus, and non-transitory computer-readable medium described above, the IMU comprises an accelerometer, a gyroscope, or a combination of at least one accelerometer and at least one gyroscope.

In some examples of the method, apparatus, and non-transitory computer-readable medium described above, the IMU is configured to measure at least one of motion or orientation of the device, the device having the image sensor affixed thereon. In some examples of the method, apparatus, and non-transitory computer-readable medium described above, the device having the image sensor affixed thereon is an AR device.

Some examples of the method, apparatus, and non-transitory computer-readable medium described above may further include starting exposure of pixels, in the row, at a first starting instant to create pixels of the first group in the row. Some examples of the method, apparatus, and non-transitory computer-readable medium described above may further include selecting the row of pixels, after the first exposure time period since the first starting instant, to read the pixels of the first group in the row during a first reading period. Some examples of the method, apparatus, and non-transitory computer-readable medium described above may further include starting exposure of pixels, in the row, at a second starting instant to create pixels of the second group in the row after an ending of the first reading period. Some examples of the method, apparatus, and non-transitory computer-readable medium described above may further include selecting the row of pixels, after the second exposure time period since the second starting instant, to read the pixels of the second group in the row during a second reading period.

Some examples of the method, apparatus, and non-transitory computer-readable medium described above may further include starting exposure of pixels, in the row, at a first starting instant to create pixels of the first group in the row. Some examples of the method, apparatus, and non-transitory computer-readable medium described above may further include starting exposure of pixels, in the same row, at a second starting instant to create pixels of the second group in the row. In some examples of the method, apparatus, and non-transitory computer-readable medium described above, the first starting instant is different from the second starting instant.

Some examples of the method, apparatus, and non-transitory computer-readable medium described above may further include selecting the row of pixels to read in parallel the pixels of the first group in the row and the pixels of second in the row.

Some examples of the method, apparatus, and non-transitory computer-readable medium described above may further include starting exposure of pixels, in the row, that belongs to the first group of pixels at a first starting instant to create pixels of the first group and pixels of the second group. Some examples of the method, apparatus, and non-transitory computer-readable medium described above may further include selecting the row of pixels, after the first exposure time period since the first starting instant, to read the pixels of the first group during a first reading period. Some examples of the method, apparatus, and non-transitory computer-readable medium described above may further include starting exposure of pixels, in the row, at a second starting instant, to create additional pixels of the second group in the row from the pixels that are read as the pixels of the first group, after an ending of the first reading period. Some examples of the method, apparatus, and non-transitory computer-readable medium described above may futher include selecting the row of pixels, after the second exposure time period since the second starting instant, to read the pixels of the second group in the row during a second reading period.

Some examples of the method, apparatus, and non-transitory computer-readable medium described above may further include starting exposure of pixels, in the row, at a first starting instant to create pixels of the first group in the row. Some examples of the method, apparatus, and non-transitory computer-readable medium described above may further include selecting the row of pixels, after the first exposure time period since the first starting instant, to read the pixels of the first group in the row during a first reading period. Some examples of the method, apparatus, and non-transitory computer-readable medium described above may further include storing in a memory buffer pixels that are read as the pixels of the first group. Some examples of the method, apparatus, and non-transitory computer-readable medium described above may further include starting exposure of pixels, in the row, at a second starting instant to create pixels of a temporary group in the row after an ending of the first reading period. Some examples of the method, apparatus, and non-transitory computer-readable medium described above may further include selecting the row of pixels, after the second exposure time period since the second starting instant, to read the pixels of the temporary group in the row during a second reading period. Some examples of the method, apparatus, and non-transitory computer-readable medium described above may further include combining the pixels stored in the memory buffer with the pixels of the temporary group to create the pixels of the second group in the row.

Some examples of the method, apparatus, and non-transitory computer-readable medium described above may further include transmitting periodically, from the image sensor to a processing unit, the first image and the second image. Some examples of the method, apparatus, and non-transitory computer-readable medium described above may further include determining the position of each of multiple identified points in the first image with a electronic circuit in the image sensor. Some examples of the method, apparatus, and non-transitory computer-readable medium described above may further include transmitting, from the image sensor to a processing unit, the position of each ofmultiple identified points in the first image.

An apparatus for positional tracking in AR applications is described. The apparatus may include an IMU configured to measure at least one of motion or orientation of the apparatus, a processing unit receiving from the IMU the at least one of motion or orientation of the apparatus, and an image sensor periodically transmitting to the processing unit a first image and a second image, wherein the first image include pixels of a first group each exposed with a corresponding exposure time period that is determined by the processing unit at least based on the measured at least one of motion or orientation of the apparatus received from the IMU, and wherein the second image include pixels of a second group each exposed with a corresponding predetermined exposure time period.

A method of manufacturing an apparatus for positional tracking in AR applications is described. The method may include providing an IMU configured to measure at least one of motion or orientation of the apparatus, providing a processing unit receiving from the IMU the at least one of motion or orientation of the apparatus, and providing an image sensor periodically transmitting to the processing unit a first image and a second image, wherein the first image include pixels of a first group each exposed with a corresponding exposure time period that is determined by the processing unit at least based on the measured at least one of motion or orientation of the apparatus received from the IMU, and wherein the second image include pixels of a second group each exposed with a corresponding predetermined exposure time period.

A method of using an apparatus for positional tracking in AR applications is described. The method may include using an IMU configured to measure at least one of motion or orientation of the apparatus, using a processing unit receiving from the IMU the at least one of motion or orientation of the apparatus, and using an image sensor periodically transmitting to the processing unit a first image and a second image, wherein the first image include pixels of a first group each exposed with a corresponding exposure time period that is determined by the processing unit at least based on the measured at least one of motion or orientation of the apparatus received from the IMU, and wherein the second image include pixels of a second group each exposed with a corresponding predetermined exposure time period.

In some examples of the apparatus, system, and method described above, the first image is constructed from the pixels of the first group, and the second image is constructed from the pixels of the second group. In some examples of the apparatus, system, and method described above, the IMU comprises an accelerometer, a gyroscope, or a combination of at least one accelerometer and at least one gyroscope. In some examples of the apparatus, system, and method described above, the image sensor is configured to transmit periodically to the processing unit the first image and the second image in alternation. In some examples of the apparatus, system, and method described above, the image sensor is configured to transmit periodically to the processing unit the first image and the second image in parallel with two virtual channels.

DETAILED DESCRIPTION

Figure 1:
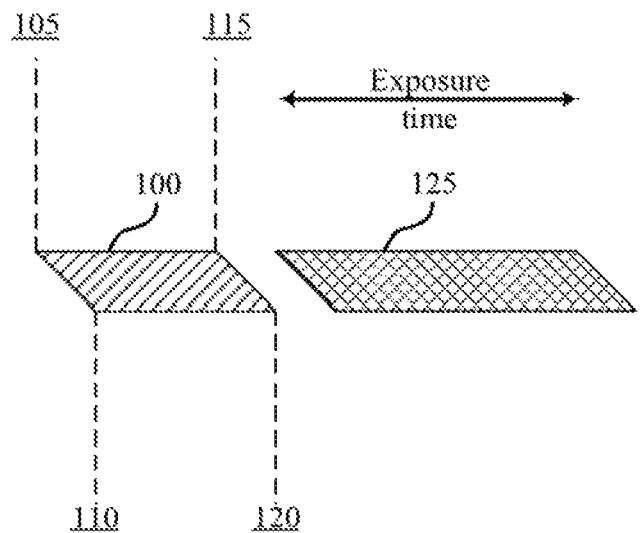
FIG. 1 shows an example of a time division timing diagram in accordance with aspects of the present disclosure.
Figure 1:
Figure 1:
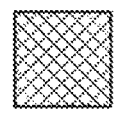

A camera may be configured for both Augmented Reality (AR) preview and positional tracking (PT) at the same time. This may be achieved by decoupling the image for AR preview and the image for PT. Thus, a different exposure time, analog gain, readout mode and digital image processing can be set for each image. In some cases, the camera may provide Key Points for PT instead of an image.

A camera may periodically transmit two images to the processing unit (e.g., using the high speed interface). The first image may be PT, and the second image may be for AR preview. This image will be in a standard format usually outputted by the camera (including, but not limited to, Bayer or other color filter array (CFA), a High Dynamic Range imaging technique that diagonally interleaves lines of pixels with long and short exposures in a zig-zag pattern (zzHDR), a technology which allows combining 4 neighboring pixels in low light to increase sensitivity or setting a different exposure value to each of the 4 neighboring pixels to increase dynamic range (i.e., in TetraCella format). The first image used for PT will be either in the same format as the image for AR preview, or a different camera output format such as downscaled image, RGB/YUV image (of any format) or Grey Levels image.

The images can be transmitted with one of the following timing schemes: alternating the images in time (for example, odd images will be for AR preview and even images will be for PT), using two virtual Mobile Industry Processor Interface (MIPI) channels, or including the PT image as a footer of the AR preview image.

In some cases, to reduce bandwidth, the camera may output only one image (using any kind of communication interface including, but not limited to, inter integrated circuit (I2C), improved inter integrated circuit (I3C), interrupt, a specific value in the header or footer) and signal the processing unit may process the image such that it can be used for both AR preview and PT.

The exposure time for the image for PT should satisfy two conditions. First, the exposure time should be long enough depending on the illumination conditions so that the signal-to-noise ratio (SNR) of the image is high enough. Second, the exposure time should be short enough so that there is no motion blur (which depends on the motion). A camera may use the low latency output from the inertial measurement unit (IMU) to compute the amount of motion applied. Moreover, the camera may collect information on the image itself (for example, a histogram) to get information on the illumination conditions. Using those two pieces of information, the camera may set the exposure time for the PT image to balance between the SNR and the motion blur. In some cases, the balance may depend on user preferences.

In some cases, the first step of a PT algorithm is to use the image to compute key point locations and descriptors. Methods for calculating key points may include but are not limited to Binary Robust Independent Elementary Features (BRIEF), Features from Accelerated Segment Test (FAST), and Oriented FAST and Rotated BRIEF (ORB) algorithms. In one embodiment, a camera can output key-points locations and descriptors instead of an image for PT. In this case, the camera may include a component (application specific integrated circuit (ASIC), digital signal processor (DSP), central processing unit (CPU), graphics processing unit (GPU) or other) which can compute the key-points locations and descriptors and those are sent to the processing unit instead of the image. Moreover, the camera may track to key-points so that there is temporal consistency between the key points sent frames after frame. Finally, the processing unit may provide feedback telling the camera which key-points are most important so that the camera can focus its tracking on those key-points.

Thus, a camera may be configured for both AR preview and PT. This may result in a PT with significantly less motion blur. Accordingly, the PT will be more robust, there will be more good frames available for key components of a PT algorithm (i.e., using visual PT to calibrate the biases of the IMU). Thus, the methods and apparatus of the present disclosure may enable more effective management of the trade-off between motion-blur, noise and resolution for PT. In particular, under high motion, high resolution (which influences the accuracy) may be less important than reducing motion-blur (which prevents tracking failure). In alternative modes of operations, the camera may be configured specifically for AR preview, or configured specifically for PT.

FIG. 1 shows an example of a time division timing diagram in accordance with aspects of the present disclosure. The example shown includes positional tracking (PT) period 100 and Augmented Reality (AR) preview period 125. There are several alternatives for transmitting the AR preview and PT image. FIG. 1 illustrates the alternative of using time division, where the image for AR preview and the image for PT can be acquired by the camera consecutively. For example, the same pixel array is configured differently on odd and even frames. That is, a first configuration may be for AR preview and the next configuration may be used for PT.

PT period 100 may include start reset time 105, end reset time 110, start read-out time 115, and end read-out time 120. PT period 100 may be an example of, or include aspects of the corresponding element described with reference to FIGS. 3, 4, and 5.

Start reset time 105, End reset time 110, Start read-out time 115, and End read-out time 120 may be an example of, or include aspects of, the corresponding elements described with reference to FIGS. 3 and 4. AR preview period 125 may be an example of, or include aspects of, the corresponding element described with reference to FIGS. 3 and 5.

Figure 2:
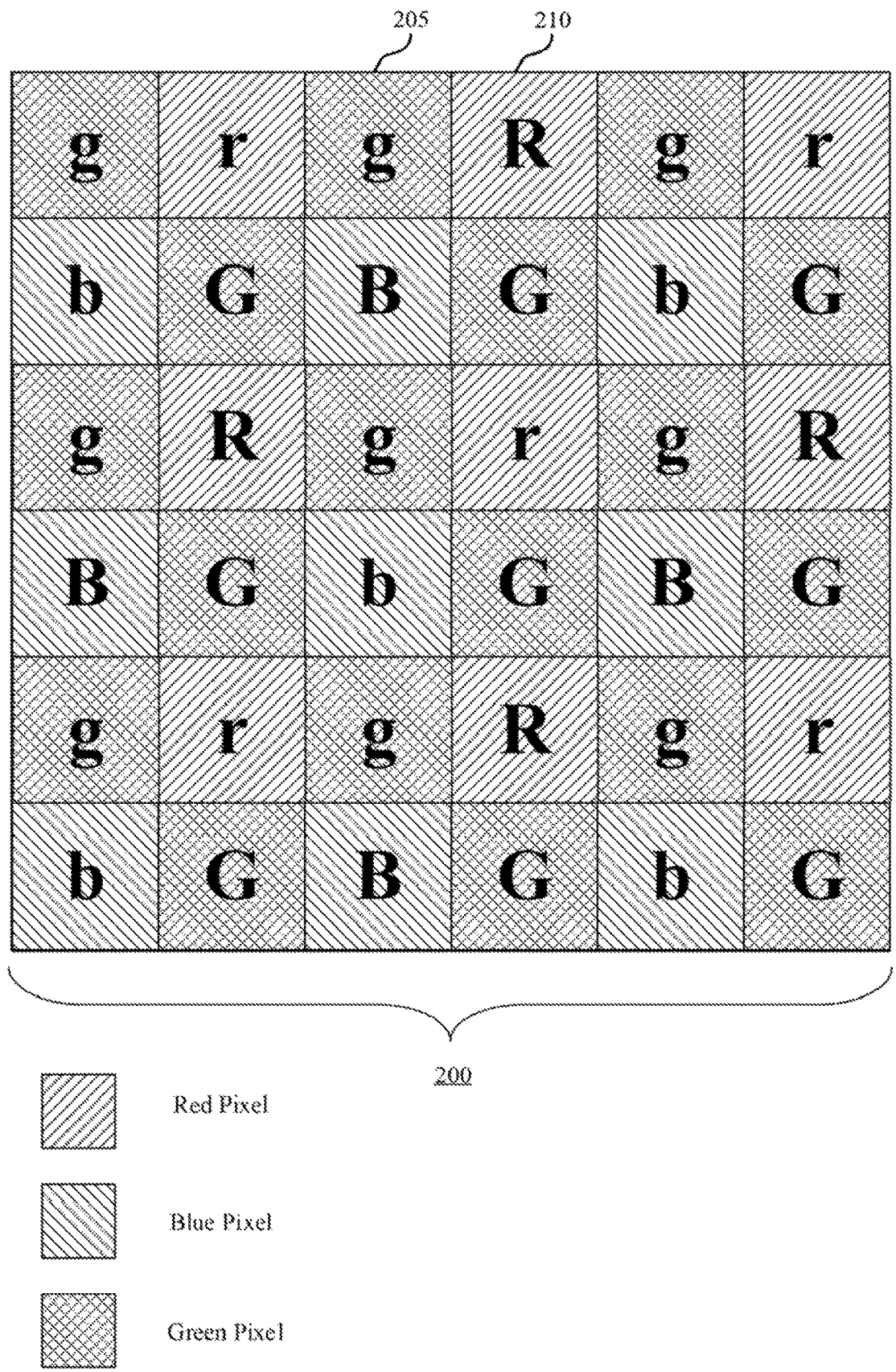
FIG. 2 shows an example of a High Dynamic Range (HDR) imaging technique that diagonally interleaves lines of pixels with long and short exposures in a zig-zag pattern (zzHDR) configuration in accordance with aspects of the present disclosure.

FIG. 2 shows an example of a High Dynamic Range imaging technique that diagonally interleaves lines of pixels with long and short exposures in a zig-zag pattern (zzHDR) configuration in accordance with aspects of the present disclosure. The example shown includes image pixels 200. Image pixels 200 may include short exposure pixels 205 and long exposure pixels 210. Short exposure pixels 200 are represented by lower case letters and long exposure pixels 205 are represented by upper case letters. Thus, each pixel is defined by a position, a color, and an exposure time.

Figure 3:
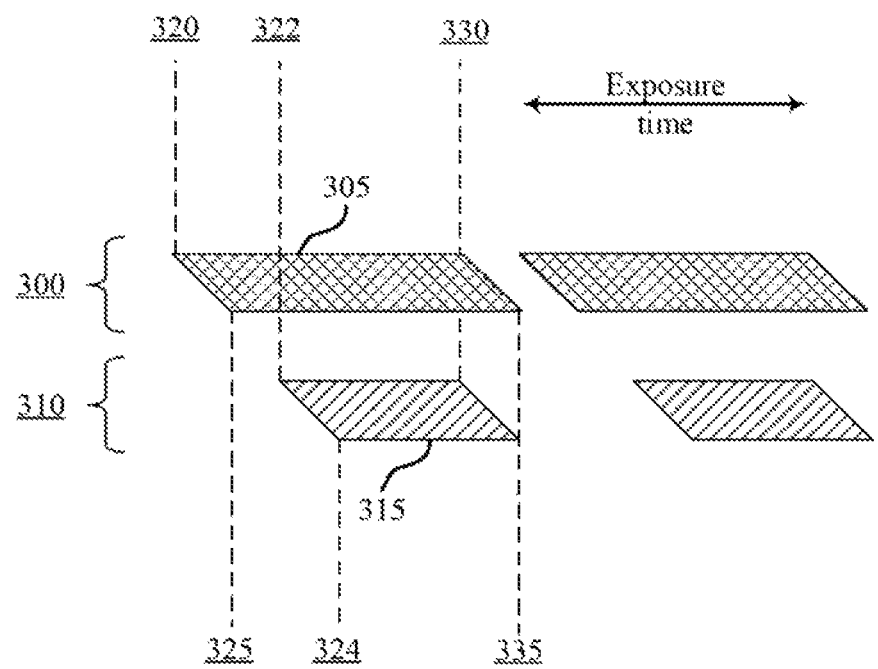
FIG. 3 shows an example of a space division timing diagram in accordance with aspects of the present disclosure.
Figure 3:
Figure 3:
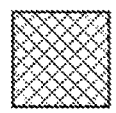

FIG. 3 shows an example of a space division timing diagram in accordance with aspects of the present disclosure. The example shown includes first pixel group timeline 310, second pixel group timeline 300, start reset time for first pixel group 322, end reset time 324 for first pixel group, start reset time for second pixel group 320, end reset time 325 for second pixel group, start read-out time 330, and end read-out time 335.

In the illustrated example, the pixels are divided in several groups, each group can be exposed to light for a different amount of time. This configuration is commn in modern cameras and used to provide High Dynamic Range images. When using space division, some groups of pixels are used for the AR preview image and some groups of pixels are used for the PT image.

First pixel group timeline 310 may include PT period 315. Second pixel group timeline 300 may include AR preview period 305. First pixel group timeline 310 and Second pixel group timeline 300 may be an example of or include aspects of the corresponding elements described with reference to FIG. 4.

PT period 315 may be an example of, or include aspects of, the corresponding element described with reference to FIGS. 1 and 5. AR preview period 305 may be an example of or include aspects of, the corresponding element described with reference to FIGS. 1, 4, and 5.

Start reset time 320, End reset time 325, Start read-out time 330, and End read-out time 335 may be an example of, or include aspects of the corresponding elements described with reference to FIGS. 1 and 4.

Figure 4:
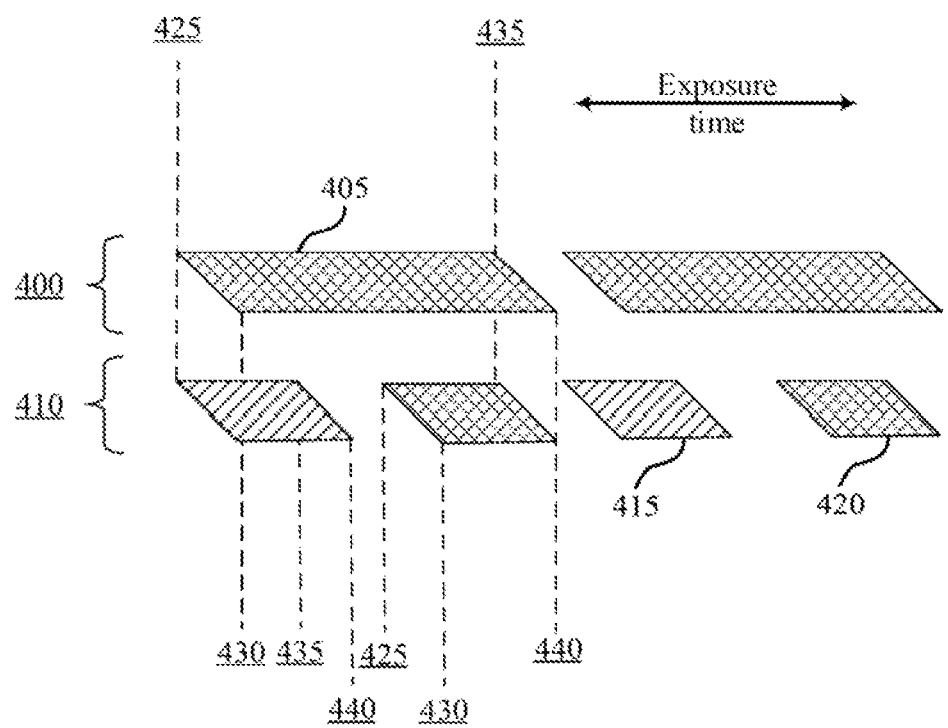
FIG. 4 shows an example of a space and time division timing diagram in accordance with aspects of the present disclosure.

FIG. 4 shows an example of a space and time division timing diagram in accordance with aspects of the present disclosure. The example shown includes first pixel group timeline 400, second pixel group timeline 410, start reset times 425, end reset times 430, start read-out times 435, and end read-out times 440.

As with the space division alternative, the pixels are divided in several groups with different exposure times. Some groups (with long exposure) are used only for the AR preview image whereas some groups (with short exposure) are used alternatively for the AR preview image and the PT image.

First pixel group timeline 400 may include AR preview long exposure period 405. Second pixel group timeline 410 may include PT period 415 and AR preview short exposure period 420. First pixel group timeline 400 and Second pixel group timeline 410 may be an example of, or include aspects of, the corresponding elements described with reference to FIG. 3. PT period 415 may be an example of, or include aspects of, the corresponding element described with reference to FIGS. 1, 3, and 5.

Start reset times 425, End reset times 430, Start read-out times 435, and End read-out times 440 may be an example of or include aspects of, the corresponding elements described with reference to FIGS. 1 and 3.

Figure 5:
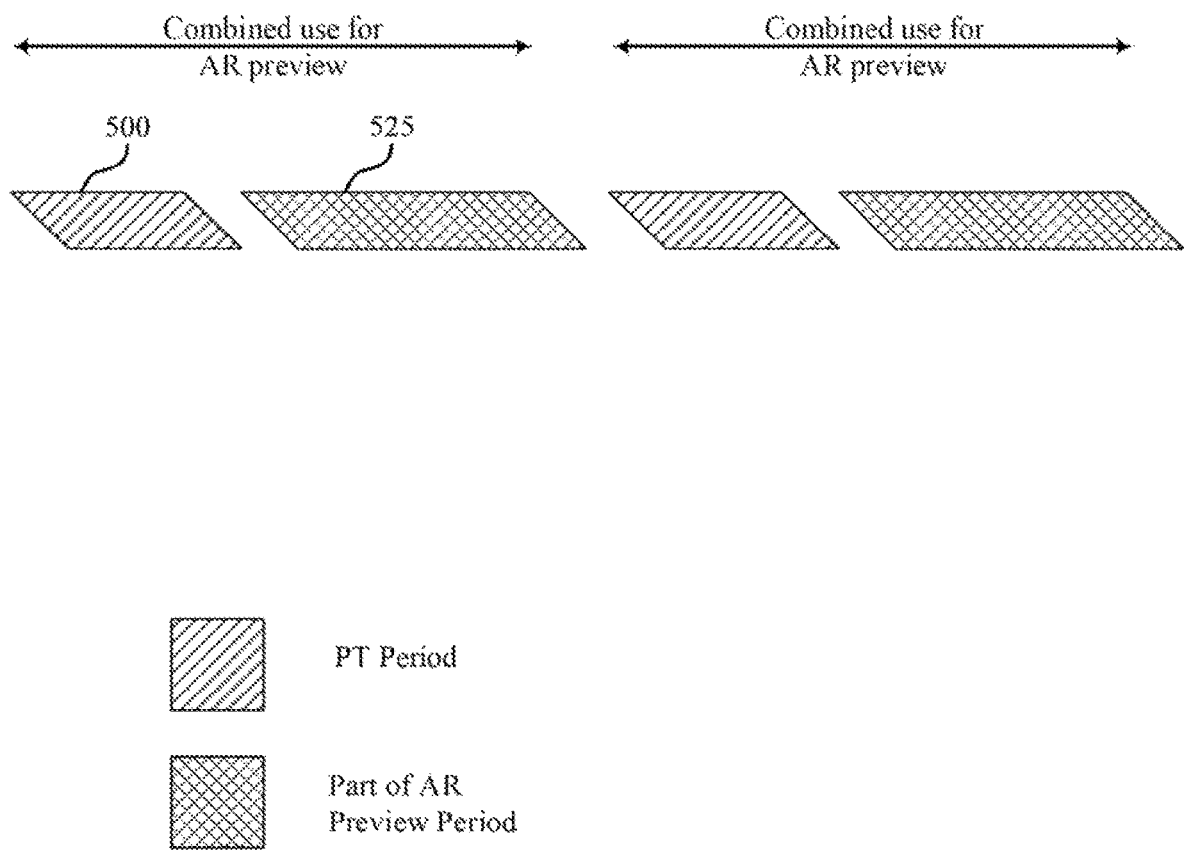
FIG. 5 shows an example of a temporal split timing diagram in accordance with aspects of the present disclosure.

FIG. 5 shows an example of a temporal split timing diagram in accordance with aspects of the present disclosure. In FIG. 5, a given pixel can be exposed with different exposure periods. For example, a given pixel can be exposed with a first exposure time period (e.g., a PT period 500) in one fame and a second exposure time period (e.g., a part of AR preview period 525) in the next frame. In some embodiments, the images captured with the PT period 500 are stored in a memory after imaging capture. A first images captured with the PT period 500 can be used in a positional tracking algorithm. A second image captured with a part of AR preview period 525 can be combined with the first image stored in the memory to create a combined image. This combined image can be used for AR preview. In this example, the camera may be acquiring images at a significantly higher frame rate than the frame rate used to transmit the images to the processing unit. The images are stored on a memory component on the camera. The camera will then sum or average a different amount of frames for the AR preview and PT images thereby simulating different exposure times.

PT period 500 may be an example of, or include aspects of, the corresponding element described with reference to FIGS. 1, 3, and 4. AR preview period 525 may be an example of, or include aspects of, the corresponding element described with reference to FIGS. 1 and 3.

Figure 6:
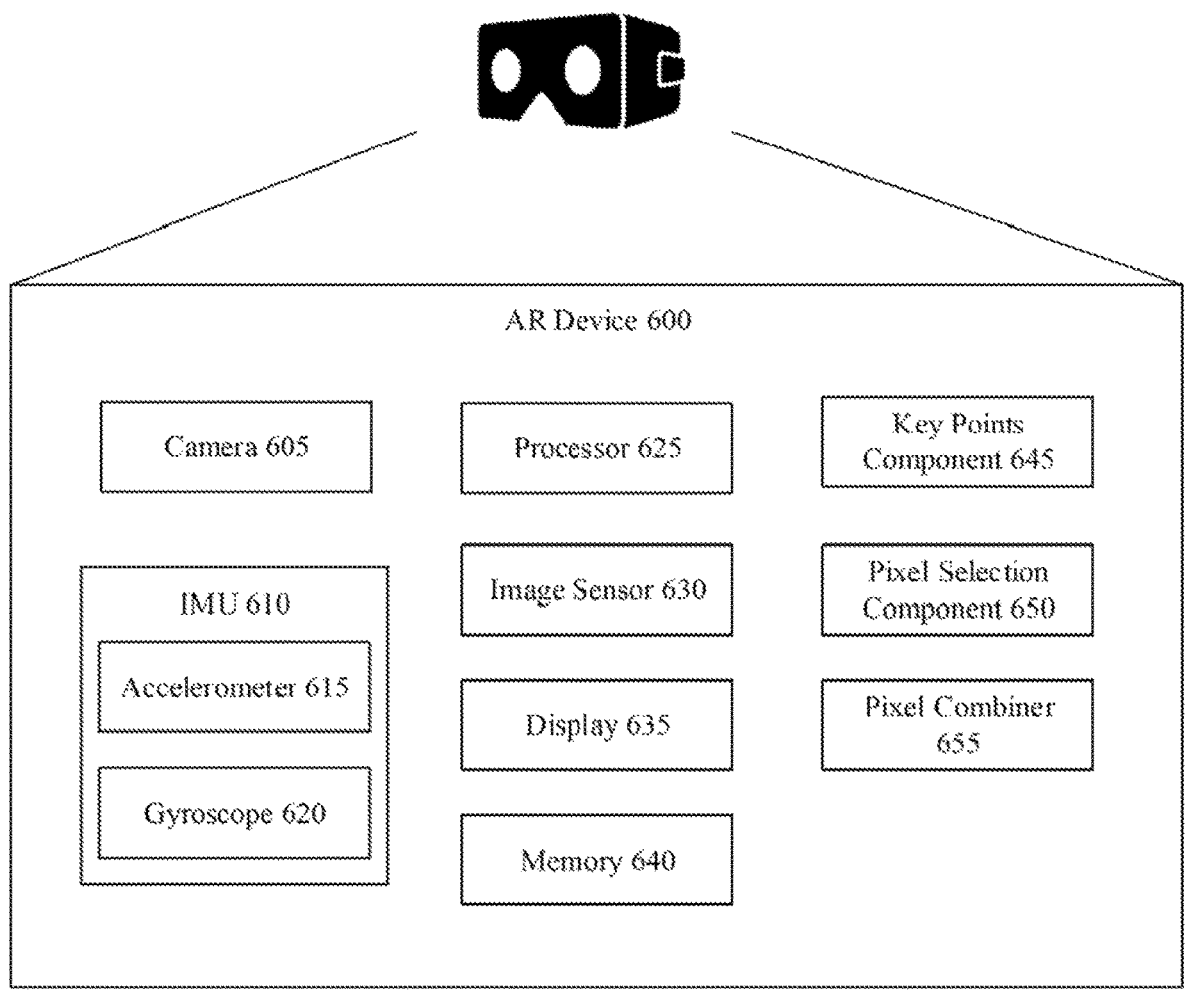
FIG. 6 shows an example of an Augmented Reality (AR) device configured for AR preview and positional tracking (PT) in accordance with aspects of the present disclosure.

FIG. 6 shows an example of an AR device 600 configured for AR preview and PT in accordance with aspects of the present disclosure. AR apparatus 600 may include camera 605, inertial measurement unit (IMU) 610, processor 625, image sensor 630, display 635, memory 640, key points component 645, pixel selection component 650, and pixel combiner 655.

In some examples, image sensor 630 is a subcomponent of camera 605. In some examples, key points component 645, pixel selection component 650, and pixel combiner 655 may be software components located in memory 640. In other examples, key points component 645, pixel selection component 650, and pixel combiner 655 may be hardware or firmware components.

A processor 625 may include an intelligent hardware device, (e.g., a general-purpose processing component, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 625 may be configured to operate a memory 640 array using a memory 640 controller. In other cases, a memory 640 controller may be integrated into processor 625. The processor 625 may be configured to execute computer-readable instructions stored in a memory 640 to perform various functions. In some examples, a processor 625 may include special purpose components for modem processing, baseband processing, digital signal processing, or transmission processing. In some examples, the processor 625 may comprise a system-on-a-chip.

Memory 640 may include RAM, ROM, or a hard disk. The memory 640 may be solid state or a hard disk drive, and may include store computer-readable, computer-executable software including instructions that, when executed, cause a processor 625 to perform various functions described herein. In some cases, the memory 640 may contain, among other things, a BIOS which may control basic hardware or software operation such as the interaction with peripheral components or devices. In some cases, a memory 640 controller may operate memory 640 cells as described herein. In some cases, memory 640 controller may include a row decoder, column decoder, or both. In some cases, memory 640 cells within a memory 640 may store information in the form of a logical state.

The IMU 610 may be configured to measure at least one of motion or orientation of the apparatus. In some examples, the IMU 610 comprises an accelerometer 615, a gyroscope 620, or a combination of at least one accelerometer 615 and at least one gyroscope 620. In some examples, the IMU 610 is configured to measure at least one of motion or orientation of the device, the device having the image sensor 630 affixed thereon. The processor 625 may receive from the IMU 610 the motion or orientation of the apparatus.

The image sensor 630 may expose pixels of a first group with a corresponding exposure time period that is determined at least based on information obtained from an IMU 610. The image sensor 630 may also expose pixels of a second group of pixels with a predetermined exposure time period at least based on information related to illumination condition.

In some embodiments, image sensor 630 may expose pixels of a first group in a row with a first exposure time, wherein the first exposure time period that is determined at least based on information obtained from an IMU 610. The image sensor 630 may also expose pixels of a second group of pixels in the row with a second exposure time period.

In some embodiments, image sensor 630 may also start exposure of pixels, in the row, at a first starting instant to create pixels of the first group in the row. The image sensor 630 may also start exposure of pixels, in the row, at a second starting instant to create pixels of the second group in the row after an ending of the first reading period.

In some embodiments, image sensor 630 may also start exposure of pixels, in the row, at a first starting instant to create pixels of the first group in the row. The image sensor 630 may also start exposure of pixels, in the same row, at a second starting instant to create pixels of the second group in the row.

In some embodiments, image sensor 630 may also start exposure of pixels, in the row, that belongs to the first group of pixels at a first starting instant to create pixels of the first group and pixels of the second group. The image sensor 630 may also start exposure of pixels, in the row, at a second starting instant, to create additional pixels of the second group in the row from the pixels that are read as the pixels of the first group, after an ending of the first reading period.

In some embodiments, image sensor 630 may also start exposure of pixels, in the row, at a first starting instant to create pixels of the first group in the row. The image sensor 630 may also start exposure of pixels, in the row, at a second starting instant to create pixels of a temporary group in the row after an ending of the first reading period.

In some embodiments, image sensor 630 may also transmit periodically, from the image sensor 630 to a processing unit, the first image and the second image. The image sensor 630 may also transmit, from the image sensor 630 to a processing unit, the position of each of multiple identified points in the first image.

In some embodiments, image sensor 630 may be periodically transmitting to the processing unit a first image and a second image, wherein the first image include pixels of a first group each exposed with a corresponding exposure time period that is determined by the processing unit at least based on the measured at least one of motion or orientation of the apparatus received from the IMU 610, and wherein the second image include pixels of a second group each exposed with a corresponding predetermined exposure time period.

In some examples, the first image is constructed from the pixels of the first group in each of multiple rows. In some examples, the second image is constructed from the pixels of the second group in each of multiple rows. In some examples, the first exposure time period that is determined at least based on information related to illumination condition and the information obtained from the IMU 610. In some examples, the first starting instant is different from the second starting instant.

In some examples, the image sensor 630 is configured to transmit periodically to the processing unit the first image and the second image in alternation. In some examples, the image sensor 630 is configured to transmit periodically to the processing unit the first image and the second image in parallel with two virtual channels.

In some embodiments, display 635 may display 635 a second image constructed from the pixels of the second group. In some embodiments, display 635 may display 635 a second image that includes the pixels of the second group in the row.

The memory 640 may store in a memory 640 buffer pixels that are read as the pixels of the first group. The key points component 645 may determine a position of each of multiple identified points in a first image constructed from the pixels of the first group. The key points component 645 may also determine a position of each of multiple identified points in a first image that includes the pixels of the first group in the row. The key points component 645 may also determine the position of each of multiple identified points in the first image with a electronic circuit in the image sensor 630.

In some embodiments, pixel selection component 650 may select the row of pixels, after the first exposure time period since the first starting instant, to read the pixels of the first group in the row during a first reading period. The pixel selection component 650 may also select the row of pixels, after the second exposure time period since the second starting instant, to read the pixels of the second group in the row during a second reading period.

In some embodiments, pixel selection component 650 may also select the row of pixels to read in parallel the pixels of the first group in the row and the pixels of second in the row. The pixel selection component 650 may also select the row of pixels, after the first exposure time period since the first starting instant, to read the pixels of the first group during a first reading period.

In some embodiments, pixel selection component 650 may also select the row of pixels, after the second exposure time period since the second starting instant, to read the pixels of the second group in the row during a second reading period. The pixel selection component 650 may also select the row of pixels, after the first exposure time period since the first starting instant, to read the pixels of the first group in the row during a first reading period. The pixel selection component 650 may also select the row of pixels, after the second exposure time period since the second starting instant, to read the pixels of the temporary group in the row during a second reading period.

The pixel combiner 655 may combine the pixels stored in the memory 640 buffer with the pixels of the temporary group to create the pixels of the second group in the row.

Figure 7:
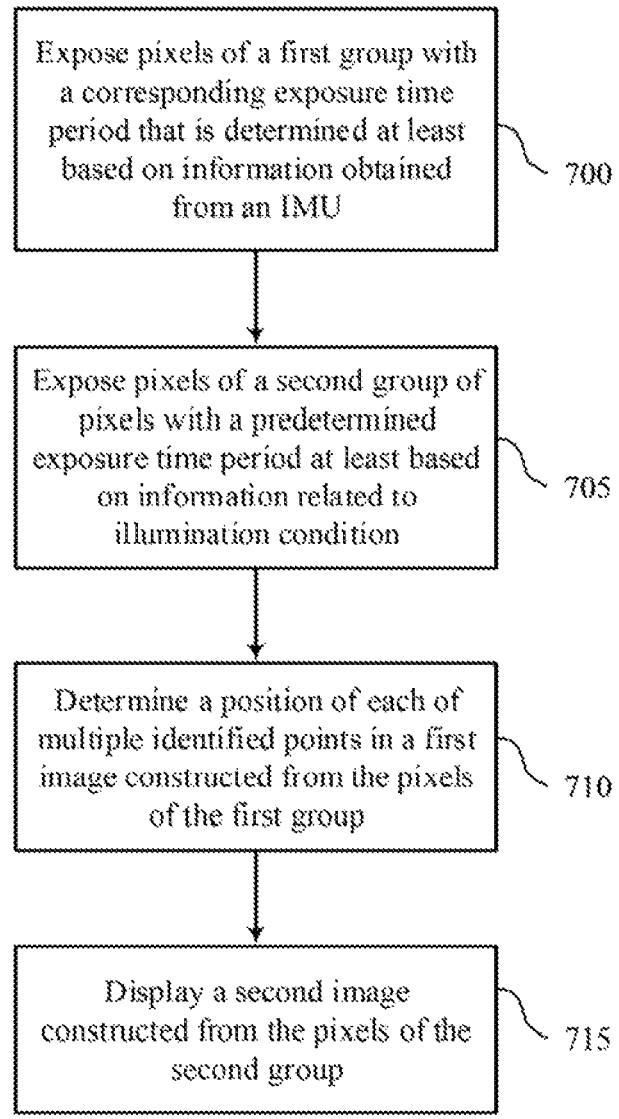
FIGS. 7 through 12 show an example of a process for generating an AR preview and PT in accordance with aspects of the present disclosure.

FIG. 7 shows an example of a process for generating an AR preview and PT in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 700, a system may expose pixels of a first group with a corresponding exposure time period that is determined at least based on information obtained from an IMU. In some cases, the operations of this step may be performed by an image sensor as described with reference to FIG. 6.

At step 705, a system may expose pixels of a second group of pixels with a predetermined exposure time period at least based on information related to illumination condition. In some cases, the operations of this step may be performed by an image sensor as described with reference to FIG. 6.

At step 710, a system may determine a position of each of multiple identified points in a first image constructed from the pixels of the first group. In some cases, the operations of this step may be performed by a key points component as described with reference to FIG. 6. In some embodiments, as a part of the positional tracking algorithm, the system may determine a position of each of multiple identified points in the first image constructed from the pixels of the first group. In other embodiments, the positional tracking algorithm may perform other functions, e.g., compute key points and descriptors.

At step 715, a system may display a second image constructed from the pixels of the second group. In some cases, the operations of this step may be performed by a display as described with reference to FIG. 6.

Figure 8:
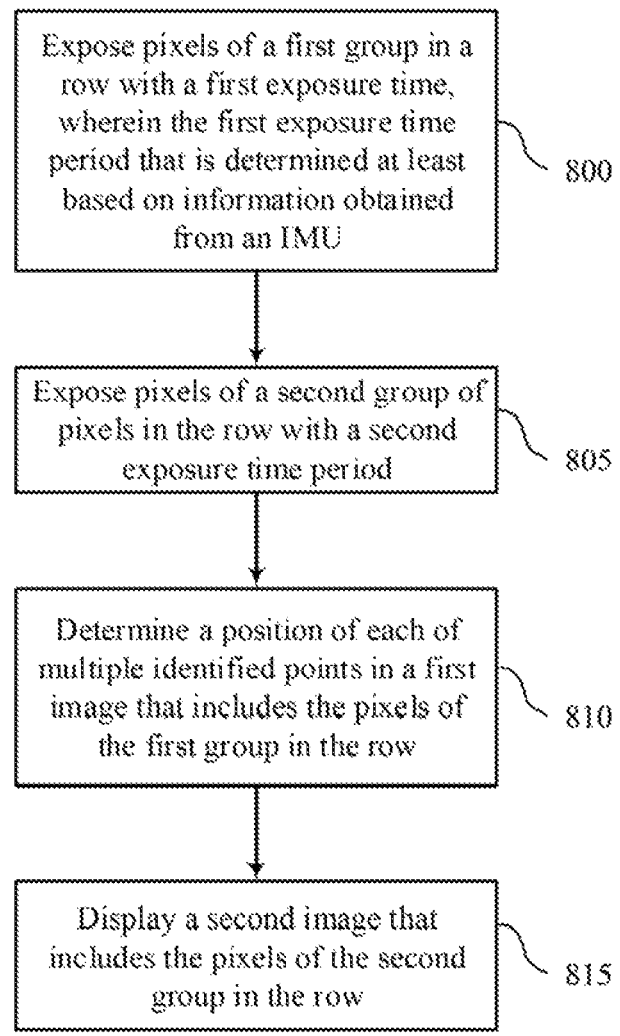

FIG. 8 shows an example of a process for generating an AR preview and PT in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 800, a system may expose pixels of a first group in a row with a first exposure time, wherein the first exposure time period that is determined at least based on information obtained from an IMU. In some cases, the operations of this step may be performed by an image sensor as described with reference to FIG. 6.

At step 805, a system may expose pixels of a second group of pixels in the row with a second exposure time period. In some cases, the operations of this step may be performed by an image sensor as described with reference to FIG. 6.

At step 810, a system may determine a position of each of multiple identified points in a first image that includes the pixels of the first group in the row. In some cases, the operations of this step may be performed by a key points component as described with reference to FIG. 6.

At step 815, a system may display a second image that includes the pixels of the second group in the row. In some cases, the operations of this step may be performed by a display as described with reference to FIG. 6.

Figure 9:
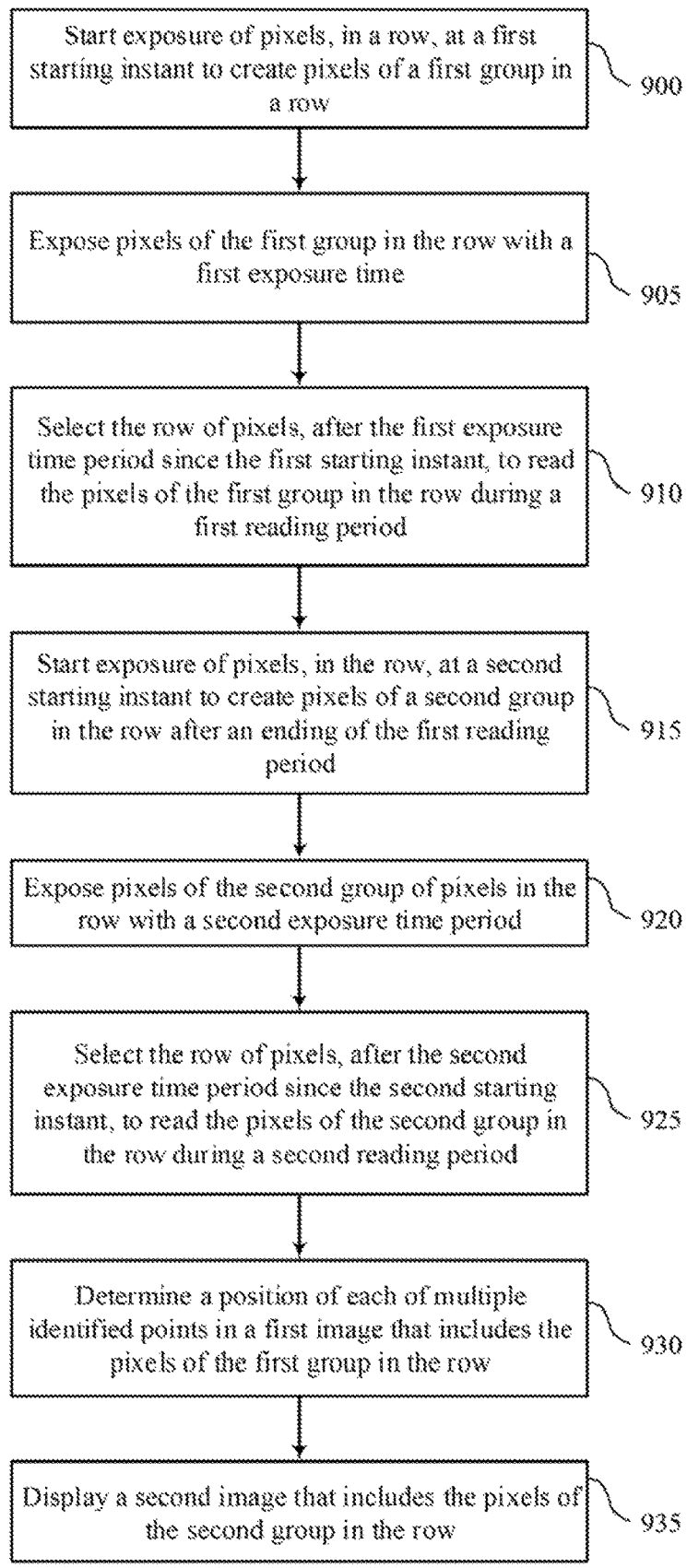

FIG. 9 shows an example of a process for generating an AR preview and PT in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 900, a system may start exposure of pixels, in a row, at a first starting instant to create pixels of a first group in the row. In some cases, the operations of this step may be performed by an image sensor as described with reference to FIG. 6.

At step 905, a system may expose pixels of the first group in the row with a first exposure time, wherein the first exposure time period that is determined at least based on information obtained from an IMU. In some cases, the operations of this step may be performed by an image sensor as described with reference to FIG. 6.

At step 910, a system may select the row of pixels, after the first exposure time period since the first starting instant, to read the pixels of the first group in the row during a first reading period. In some cases, the operations of this step may be performed by a pixel selection component as described with reference to FIG. 6.

At step 915, a system may start exposure of pixels, in the row, at a second starting instant to create pixels of a second group in the row after an ending of the first reading period. In some cases, the operations of this step may be performed by an image sensor as described with reference to FIG. 6.

At step 920, a system may expose pixels of the second group of pixels in the row with a second exposure time period. In some cases, the operations of this step may be performed by an image sensor as described with reference to FIG. 6.

At step 925, a system may select the row of pixels, after the second exposure time period since the second starting instant, to read the pixels of the second group in the row during a second reading period. In some cases, the operations of this step may be performed by a pixel selection component as described with reference to FIG. 6.

At step 930, a system may determine a position of each of multiple identified points in a first image that includes the pixels of the first group in the row. In some cases, the operations of this step may be performed by a key points component as described with reference to FIG. 6.

At step 935, a system may display a second image that includes the pixels of the second group in the row. In some cases, the operations of this step may be performed by a display as described with reference to FIG. 6.

Figure 10:
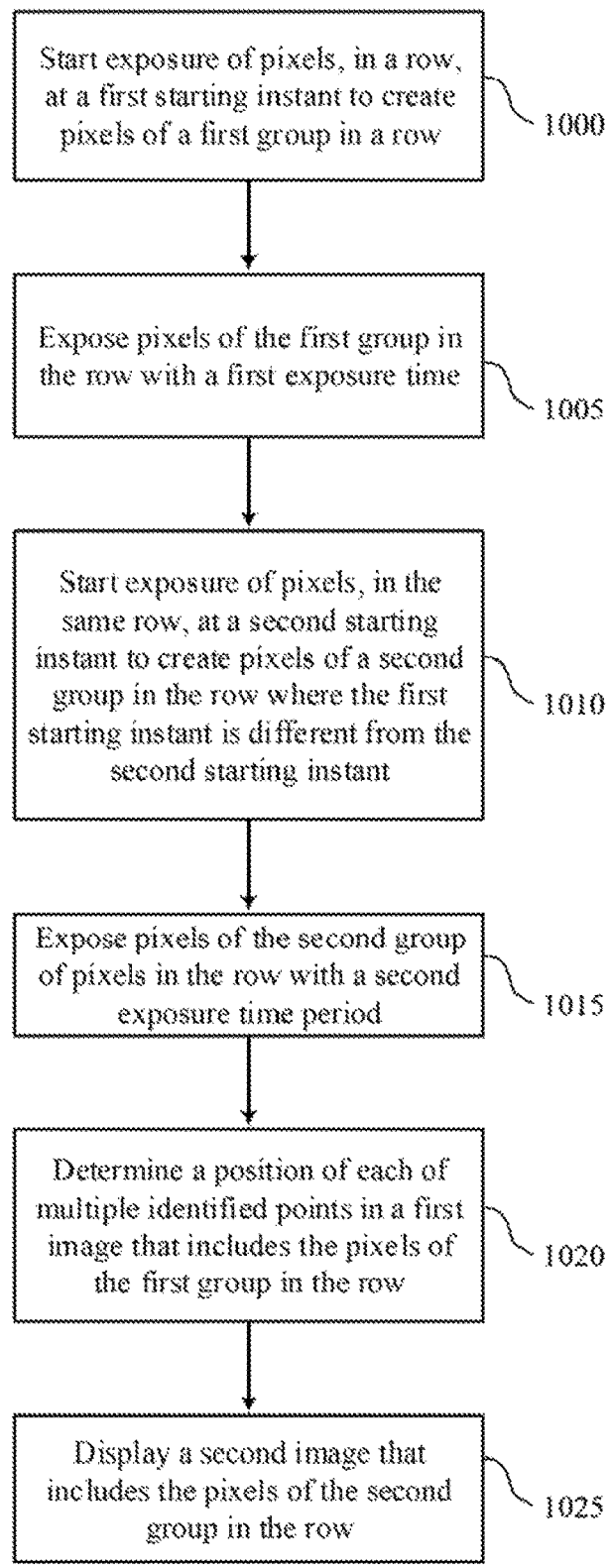

FIG. 10 shows an example of a process for generating an AR preview and PT in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1000, a system may start exposure of pixels, in a row, at a first starting instant to create pixels of a first group in the row. In some cases, the operations of this step may be performed by an image sensor as described with reference to FIG. 6.

At step 1005, a system may expose pixels of the first group in the row with a first exposure time, wherein the first exposure time period that is determined at least based on information obtained from an IMU. In some cases, the operations of this step may be performed by an image sensor as described with reference to FIG. 6.

At step 1010, a system may start exposure of pixels, in the same row, at a second starting instant to create pixels of a second group in the row where the first starting instant is different from the second starting instant. In some cases, the operations of this step may be performed by an image sensor as described with reference to FIG. 6.

At step 1015, a system may expose pixels of the second group of pixels in the row with a second exposure time period. In some cases, the operations of this step may be performed by an image sensor as described with reference to FIG. 6.

At step 1020, a system may determine a position of each of multiple identified points in a first image that includes the pixels of the first group in the row. In some cases, the operations of this step may be performed by a key points component as described with reference to FIG. 6.

At step 1025, a system may display a second image that includes the pixels of the second group in the row. In some cases, the operations of this step may be performed by a display as described with reference to FIG. 6.

Figure 11:
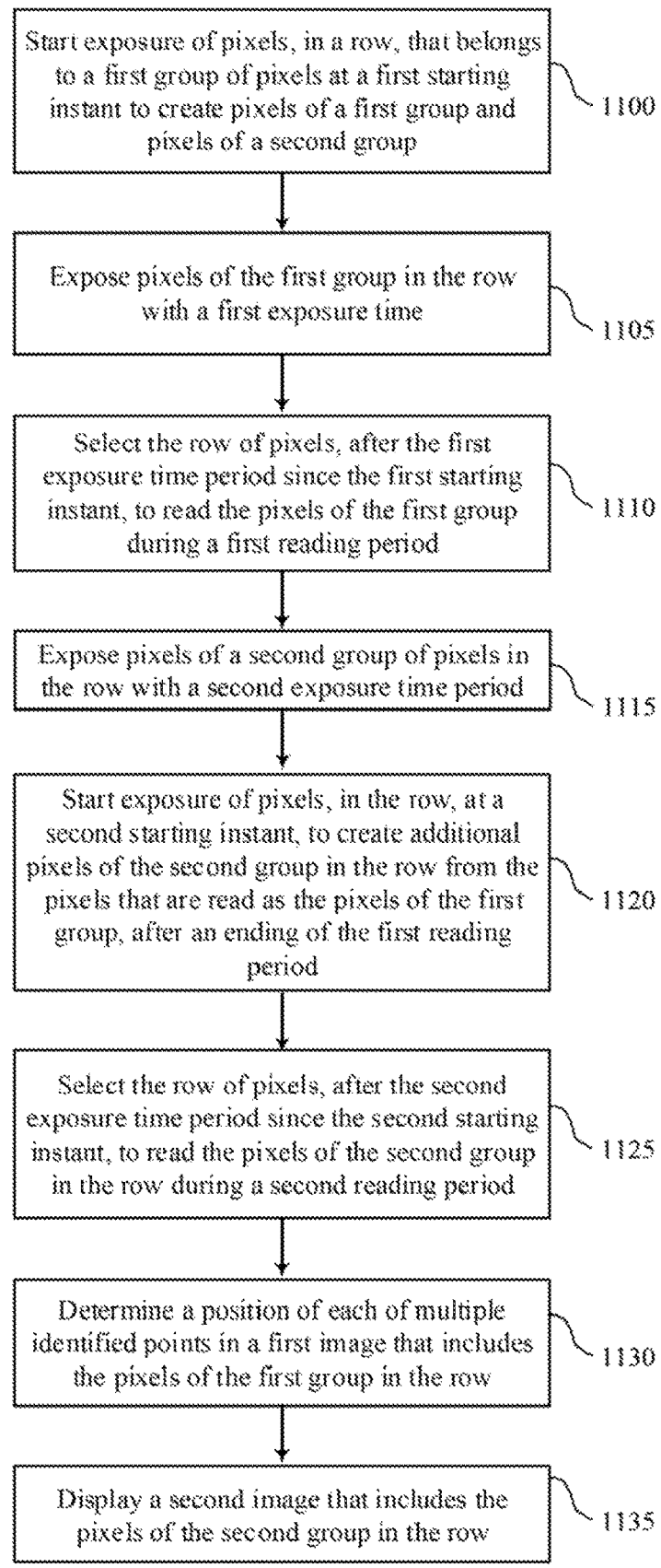

FIG. 11 shows an example of a process for generating an AR preview and PT in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1100, a system may start exposure of pixels, in a row, that belongs to a first group of pixels at a first starting instant to create pixels of the first group and pixels of a second group. In some cases, the operations of this step may be performed by an image sensor as described with reference to FIG. 6.

At step 1105, a system may expose pixels of the first group in the row with a first exposure time, wherein the first exposure time period that is determined at least based on information obtained from an IMU. In some cases, the operations of this step may be performed by an image sensor as described with reference to FIG. 6.

At step 1110, a system may select the row of pixels, after the first exposure time period since the first starting instant, to read the pixels of the first group during a first reading period. In some cases, the operations of this step may be performed by a pixel selection component as described with reference to FIG. 6.

At step 1115, a system may expose pixels of the second group of pixels in the row with a second exposure time period. In some cases, the operations of this step may be performed by an image sensor as described with reference to FIG. 6.

At step 1120, a system may start exposure of pixels, in the row, at a second starting instant, to create additional pixels of the second group in the row from the pixels that are read as the pixels of the first group, after an ending of the first reading period. In some cases, the operations of this step may be performed by an image sensor as described with reference to FIG. 6.

At step 1125, a system may select the row of pixels, after the second exposure time period since the second starting instant, to read the pixels of the second group in the row during a second reading period. In some cases, the operations of this step may be performed by a pixel selection component as described with reference to FIG. 6.

At step 1130, a system may determine a position of each of multiple identified points in a first image that includes the pixels of the first group in the row. In some cases, the operations of this step may be performed by a key points component as described with reference to FIG. 6.

At step 1135, a system may display a second image that includes the pixels of the second group in the row. In some cases, the operations of this step may be performed by a display as described with reference to FIG. 6.

Figure 12:
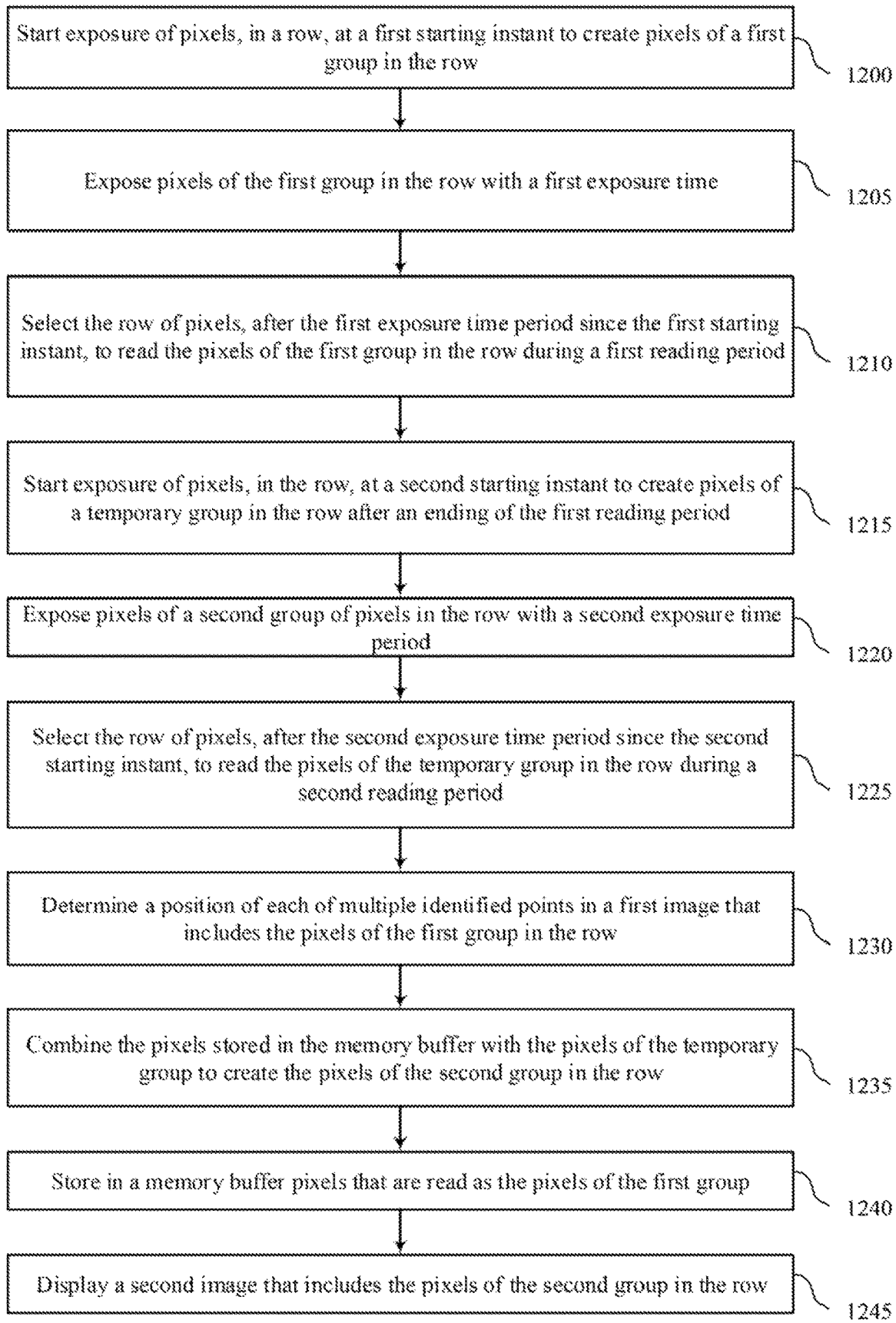

FIG. 12 shows an example of a process for generating an AR preview and PT in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 1200, a system may start exposure of pixels, in a row, at a first starting instant to create pixels of a first group in the row. In some cases, the operations of this step may be performed by an image sensor as described with reference to FIG. 6.

At step 1205, a system may expose pixels of the first group in the row with a first exposure time, wherein the first exposure time period that is determined at least based on information obtained from an IMU. In some cases, the operations of this step may be performed by an image sensor as described with reference to FIG. 6.

At step 1210, a system may select the row of pixels, after the first exposure time period since the first starting instant, to read the pixels of the first group in the row during a first reading period. In some cases, the operations of this step may be performed by a pixel selection component as described with reference to FIG. 6.

At step 1215, a system may start exposure of pixels, in the row, at a second starting instant to create pixels of a temporary group in the row after an ending of the first reading period. In some cases, the operations of this step may be performed by an image sensor as described with reference to FIG. 6.

At step 1220, a system may expose pixels of a second group of pixels in the row with a second exposure time period. In some cases, the operations of this step may be performed by an image sensor as described with reference to FIG. 6.

At step 1225, a system may select the row of pixels, after the second exposure time period since the second starting instant, to read the pixels of the temporary group in the row during a second reading period. In some cases, the operations of this step may be performed by a pixel selection component as described with reference to FIG. 6.

At step 1230, a system may determine a position of each of multiple identified points in a first image that includes the pixels of the first group in the row. In some cases, the operations of this step may be performed by a key points component as described with reference to FIG. 6.

At step 1235, a system may combine the pixels stored in the memory buffer with the pixels of the temporary group to create the pixels of the second group in the row. In some cases, the operations of this step may be performed by a pixel combiner as described with reference to FIG. 6.

At step 1240, a system may store in a memory buffer pixels that are read as the pixels of the first group. In some cases, the operations of this step may be performed by a memory as described with reference to FIG. 6.

At step 1245, a system may display a second image that includes the pixels of the second group in the row. In some cases, the operations of this step may be performed by a display as described with reference to FIG. 6.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

The described methods may be implemented or performed by devices that include a general-purpose processor, a DSP, an ASIC, an FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read only memory (EEPROM), compact disk (CD) ROM or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, digital subscriber line (DSL), or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." The term "non-transitory" as used herein is a limitation on the medium itself, which is tangible such as a flash memory, a dynamic random-access memory, or the like, rather than a mere signal. The "non-transitory" limitation shall not invoke a limitation on data storage persistency, per se.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed and claimed herein.

What is claimed is:

1. An apparatus comprising:
an inertial measurement unit (IMU) configured to measure at least one of motion or orientation of the apparatus; and
an image sensor configured to generate a first image and a second image,
wherein the first image is constructed from pixels of a first group each exposed with a first exposure time period determined based on the measured at least one of motion or orientation of the apparatus received from the IMU,
wherein the second image is constructed from pixels of a second group with a second exposure time period based on information related to an illumination condition,
wherein the second exposure time period is different from the first exposure time, and
wherein the first image is for a positional tracking image and the second image is for an augmented reality preview image.

2. The apparatus of claim 1, wherein at least part of the first exposure time period is overlapped with at least part of the second exposure time period.

3. The apparatus of claim 1, wherein the image sensor is a part of an augmented reality device.

4. The apparatus of claim 1, wherein the image sensor is a part of a virtual reality device.

5. The apparatus of claim 1, wherein the image sensor is configured to transmit periodically to a processing unit the first image and the second image in alternation.

6. The apparatus of claim 1, wherein the image sensor is configured to transmit periodically to a processing unit the first image and the second image in parallel with two virtual channels.

7. The apparatus of claim 1, wherein the second exposure time is longer than the first exposure time.

8. The apparatus of claim 1, wherein a format of the first image is the same with a format of the second image.

9. The apparatus of claim 1, wherein the pixels of a second group are interleaved among the pixels of the first group.

10. An apparatus comprising:
an inertial measurement unit (IMU) configured to measure at least one of motion or orientation of the apparatus; and
an image sensor configured to generate a first image and a second image,
wherein the first image is constructed from pixels of a first group each exposed with a first exposure time period determined based on the measured at least one of motion or orientation of the apparatus received from the IMU,
wherein the second image is constructed from pixels of a second group with a second exposure time period based on information related to an illumination condition,
wherein the second exposure time period is different from the first exposure time,
wherein the first image is for a positional tracking image and the second image is for an augmented reality preview image, and
wherein the second exposure time period starts after the first exposure time period ends.

11. The apparatus of claim 10, wherein the first image is generated in a first frame and the second image is generated in a second frame following the first frame.

12. The apparatus of claim 10, wherein the image sensor is a part of an augmented reality device.

13. The apparatus of claim 10, wherein the image sensor is a part of a virtual reality device.

14. The apparatus of claim 10, wherein the image sensor is configured to transmit periodically to a processing unit the first image and the second image in alternation.

15. The apparatus of claim 10, wherein the image sensor is configured to transmit periodically to a processing unit the first image and the second image in parallel with two virtual channels.

16. The apparatus of claim 10, wherein the second exposure time is longer than the first exposure time.

17. The apparatus of claim 10, wherein a format of the first image is the same with a format of the second image.

18. The apparatus of claim 10, wherein the pixels of a second group are interleaved among the pixels of the first group.

19. An augmented reality (AR) apparatus comprising:
an inertial measurement unit (IMU) configured to measure at least one of motion or orientation of the AR device;
an image sensor configured to generate a position tracking (PT) image constructed from pixels of a first group exposed with a first exposure time period, and an augmented reality (AR) preview image constructed from pixels of a second group exposed with a second exposure time period different from the first exposure time period;
a memory configured to store the PT image and the AR preview image; and
a key point component configured to determine a position of each of points in the PT image; and
a display configured to display the AR preview image stored in the memory,
wherein the first exposure time period is determined based on the measured at least one of motion or orientation of the apparatus received from the IMU, and
the second exposure time period is determined based on an illumination condition.

20. The AR apparatus of claim 19, wherein the second exposure time is longer than the first exposure time.

* * * * *